United States Patent [19]

Karr et al.

[11] 4,451,963

[45] Jun. 5, 1984

[54] WHEEL AND TIRE POSITIONING SYSTEM

[75] Inventors: Willis F. Karr, Key Largo, Fla.; John P. Kane, Sterling Heights, Mich.

[73] Assignee: Acme Precision Products, Inc., Detroit, Mich.

[21] Appl. No.: 250,629

[22] Filed: Apr. 3, 1981

[51] Int. Cl.³ .................... B23Q 17/00; B23P 19/00
[52] U.S. Cl. ........................................ 29/407; 29/720; 29/802
[58] Field of Search .................... 73/146; 29/464, 559, 29/802, 407, 710; 157/1, 1.1

[56] References Cited

U.S. PATENT DOCUMENTS

| | | | |
|---|---|---|---|
| 4,198,858 | 4/1980 | Farmer et al. | 73/146 |
| 4,359,897 | 11/1982 | Ugo | 73/146 |

*Primary Examiner*—James G. Smith
*Attorney, Agent, or Firm*—Basile, Weintraub & Hanlon

[57] ABSTRACT

A method and apparatus for rotatably positioning an uninflated tire relative to its wheel about the axis of the wheel whereby a predetermined relationship between wheel and tire will exist upon inflation. In the system of the invention an uninflated tubeless tire is placed upon its wheel in a random manner, both tire and wheel having indicia defined thereon indicating a desired final orientation. Automatic sensing apparatus determines the angular relationship between the wheel and tire indicia about the wheel axis, records and analyzes the position of the indicia, and thereupon the wheel and tire are automatically rotated relative to each other with respect to the wheel axis an angular degree which will locate the wheel and tire indicia in a predetermined relationship, usually at a 0° deviation with respect to each other.

15 Claims, 8 Drawing Figures

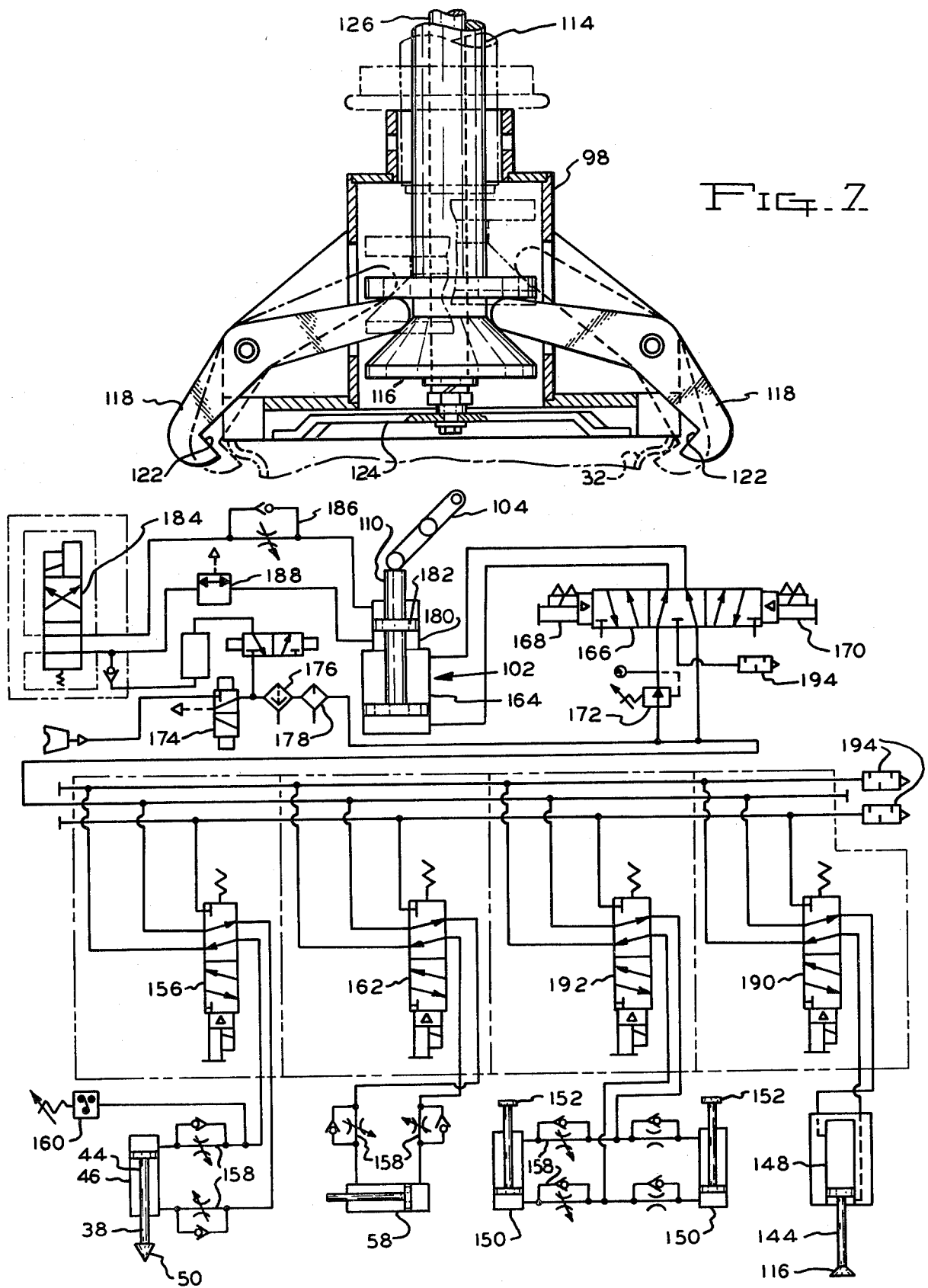

WHEEL AND TIRE POSITIONING SYSTEM

BACKGROUND OF THE INVENTION

The invention pertains to a tire positioning system incorporated into a tire mounting assembly line whereby the wheel and its associated tubeless tire are angularly oriented to each other in a predetermined manner prior to tire inflation.

In the high production assembly of wheels and tires conveyor lines are employed having a plurality of processing stations wherein the wheel and tire are processed toward final assembly. Basically, such a wheel and tire assembly line includes a primary conveyor to which a wheel and tire are separately conveyed upon pallets or other conventional material handling apparatus. The tire is preliminarily laid upon the wheel, and at succeeding stations the tire may be soaped or otherwise lubricated prior to being pushed over the wheel rim whereby the tire beads will be located within the confines of the wheel rim. Usually, the next step is to inflate the tire which is accomplished by placing an air chamber against the wheel sidewall while holding the sidewall away from the wheel rim. Compressed air is rapidly introduced into the tire causing the sidewall to sealingly engage the wheel rim completing inflation. Thereupon, the wheel and tire assembly is completed, and if desired, other stations producing balancing, or secondary operations may be included.

In the evaluation of tire and wheel running characteristics it has long been appreciated that balancing of the assembled tire and wheel is necessary to produce optimum tire wear, smooth operation, roadability, safety and optimum riding characteristics. Accordingly, assembled wheels and tires are normally balanced by the addition of weights to the wheel rim to equalize the distribution of wheel and tire weight about the tire axis. The weighting, and the determining of the location of the weights, may be done while the wheel is in a dynamic or static condition, usually dynamic balancing achieving the most accurate results. Under dynamic balancing lateral, as well as radial, imbalances can be detected and compensated for.

It has further been appreciated that harmonic forces within tires occur which affect tire wear, riding comfort, etc., and imbalance occurring within the wheel, itself, create problems under rapid wheel rotation. Accordingly, as both the tire and wheel, as manufactured, do not have uniform weight distribution it is desirable to preliminarily orient the wheel and tire after initial assembly, and prior to tire inflation, to orient those portions of the wheel and tire most likely to create imbalance whereby during the final balancing of the wheel assembly a minimum of weights and simplified balancing procedures can be utilized. Apparatus has been developed whereby the maximum tire radial first harmonic force, called a "high point", can be identified prior to the tire being mounted upon a wheel, and the point upon the wheel wherein minimum average radial run out occurs, called the "low point", can be identified by the wheel valve stem hole. By marking the tire high point and the wheel low point with indicia prior to assembly and orienting the high and low point to each other relative to the wheel axis after assembly final wheel-tire balancing is facilitated. Previously, such preliminary orientation of the wheel and tire prior to inflation, if accomplished, was done manually and in a haphazard manner. With the apparatus of the invention such wheel and tire orientation is automatically achieved efficiently and accurately without human operation or supervision.

It is an object of the invention to provide a method and apparatus for orienting predetermined locations of a tire relative to its wheel prior to tire inflation wherein the sensing of predetermined positions upon the wheel and tire automatically occur, and the wheel and tire are rotated relative to each other to angularly orient such predetermined locations.

A further object of the invention is to provide a method and apparatus for orienting an uninflated tubeless tire relative to its wheel by automatically sensing the location of light responsive indicia defined on the tire and wheel, and wherein the sensing of such indicia produces electronic signals which are stored and analyzed to control apparatus for relatively rotating the tire and wheel to orient the indicia to each other in a predetermined manner.

Another object of the invention is to provide automatic tire and wheel positioning and orientation apparatus wherein the angular relationship of tire and wheel indicia relative to the wheel axis is electronically sensed and analyzed and the tire and wheel are then rotated relative to each other in a direction minimizing the necessary relative tire and wheel movement to orient the indicia in a predetermined manner.

An additional object of the invention is to provide automatic wheel and tire positioning apparatus wherein the wheel and tire may be rotatably oriented to each other in a predetermined manner, and the apparatus may be incorporated into conventional wheel and tire mounting and assembling systems compatible with known tire mounting apparatus.

In the practice of the invention the tires to be mounted, usually radial passenger car tires, although not limited thereto, are placed upon sensing equipment which weighs and tests the tire to locate the circumferential location of the maximum first harmonic force. Once this "high point" portion of the tire is determined indicia indicating such position is applied to the tire, preferably upon the sidewall, and in the preferred embodiment the indicia comprises a reflective mark or patch capable of reflecting ultraviolet light. Likewise, the wheel to which the tire is to be mounted also receives ultraviolet light reflecting indicia at its minimum average radial run out point, i.e. "low point", which normally coincides with the tire stem hole. When the wheel and its tire are preassembled the indicia applied thereto are visible from a common side of the wheel and tire. Usually, the axes of the wheel and tire, after preliminary assembly, are vertically oriented, and the indicia appears upon the upper side of the tire and wheel.

After the tire has been placed between the rims of the wheel the wheel is indexed on a conveyor to a sensing station and the wheel oriented coaxially with a sensing axis. Ultraviolet light sensing means rotate about the sensing axis and upon the sensing means separately sensing the location of the tire and wheel indicia electronic signals are produced which are received, stored and analyzed by computing means. As the sensing means rotates about the sensing axis the sensing of the wheel and tire indicia produces signals indicative of the angular relationship of the wheel and tire indicia relative to the wheel axis, and the computing means analyzes such data to produce a control signal for regulating subsequent relative rotation between the tire and wheel.

After sensing of the indicia the wheel and tire are transferred a short distance to another work station without relative rotational movement occurring between the wheel and tire. At this station the wheel is oriented coaxial with an orientation axis and relative rotation between the wheel and tire occurs as determined by the control signal from the computer means. While relative rotation between the tire and wheel may be achieved by rotating the wheel within the tire, or rotating the tire upon the wheel, in the preferred embodiment the tire is raised slightly with respect to the wheel to minimize frictional engagement therebetween, and is rotated in that direction under the influence of the computer means which most quickly orient the wheel and tire indicia in a predetermined manner, usually with a 0° deviation relative to each other about the wheel axis.

Once the wheel and tire are angularly oriented as desired they are transferred to an inflation station which may be of conventional construction, without relative rotation existing therebetween, and upon inflation of the tire the desired rotational orientation of wheel and tire will be achieved.

In the practice of the invention the sensing of the wheel and tire indicia and the relative rotation of the wheel and tire is automatically produced by means of switches, interlocks, and other known control apparatus and by locating the sensing and orientation axes within the regular tire mounting conveyor the aforedescribed wheel and tire positioning apparatus can be achieved without extensive modification to existing tire mounting systems.

BRIEF DESCRIPTION OF THE DRAWINGS

The aforementioned objects and advantages of the invention will be appreciated from the following description and accompanying drawings wherein:

FIG. 7 is an enlarged, elevational, sectional, detail view of the wheel clamping structure illustrating three operational positions of the fingers in dotted lines, and FIG. 8 is a schematic view of the air and electrical control circuit utilized with the apparatus of the invention.

DESCRIPTION OF THE PREFERRED EMBODIMENT

Figure 1:
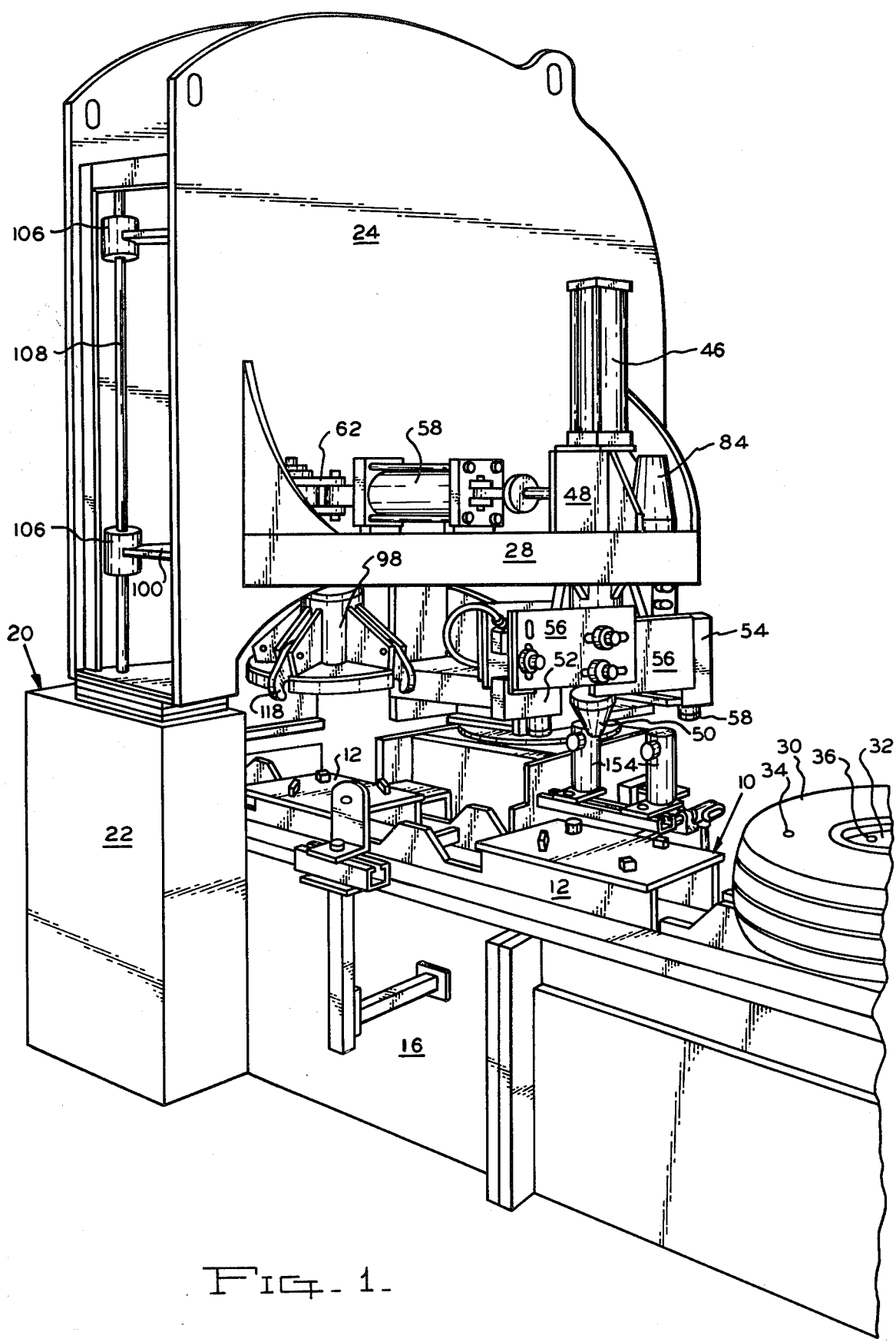
FIG. 1 is a front perspective view of wheel and tire positioning apparatus in accord with the invention.
Figure 2:
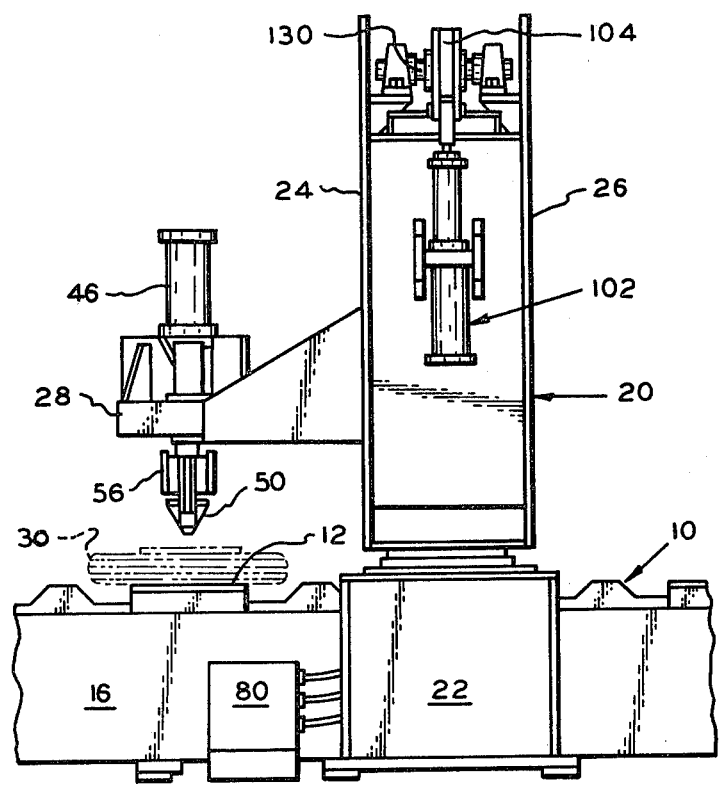
FIG. 2 is a side elevational view of the wheel and tire positioning apparatus as taken from the back side of FIG. 1.
Figure 3:
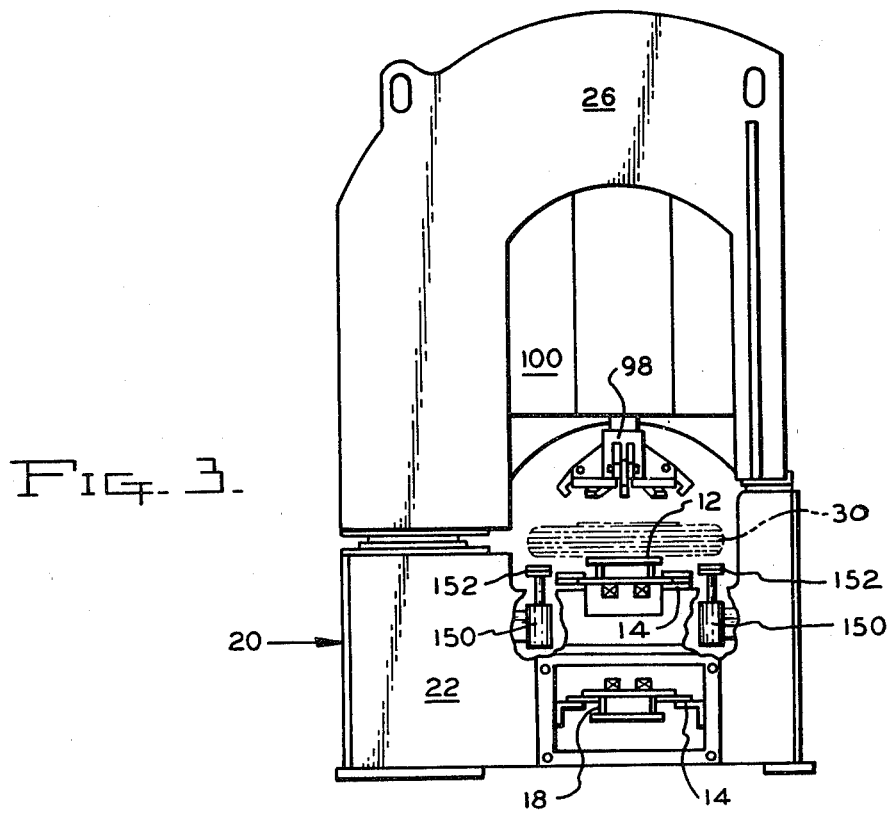
FIG. 3 is a rear elevational view of the apparatus as taken from the right of FIG. 2.

The apparatus of the invention is incorporated into a conveyor line for mounting and inflating tires, usually tubeless tires, upon their wheels. In FIG. 1, a portion of such a conveyor line is represented at 10 wherein the conveyor line includes a plurality of separate pallets 12 mounted upon chains 14, FIG. 3, or other conventional conveyor structure capable of moving in a horizontal direction between work stations. Indexing conveyor drive means, not shown, index the pallets 12 between the successive work stations, and the conveyor includes lateral support structure 16 housing the lower "return" portion 18 of the conveyor, FIG. 3, as is known. The details of operation of the conveyor form no part of the present invention and may be of conventional construction.

The tire and wheel positioning system of the invention, in the preferred embodiment, constitutes a frame generally indicated at 20, which straddles the conveyor 10. The frame includes a base 22 disposed upon opposite sides of the conveyor, and the superstructure includes a front plate 24, and a rear plate 26. An overhang plate 28 extends from the front plate 24 over the conveyor in an "upstream" direction and the plate 28 constitutes the support platform for the indicia sensing apparatus.

The tire 30 and wheel 32 being conveyed to the wheel and tire positioning apparatus each have indicia defined thereon, on the upper side thereof, such indicia usually indicating the point of maximum first harmonic force of the tire, also known as the high point, and the indicia formed upon the wheel indicates the minimum average radial run out, also known as the low point, which is normally identified as occurring at the valve stem hole. This indicia may constitute a mark or patch ½" to 1" in diameter and it must be visible, white and, preferably, water soluble. Further, as the sensing apparatus of the described embodiment utilizes ultraviolet light the indicia must be capable of reflecting strength above 8 on the Ciba-Greigy Scale. For instance, an ultraviolet reflective material as manufactured by Dell Products, DPI 567 is suitable.

The tire indicia 34 and the wheel indicia 36 will be randomly oriented to each other relative to the axis of the wheel 32, and prior to the wheel and tire arriving at the indicia positioning station the tire will have been mounted upon the wheel whereby the tire beads are located intermediate the wheel rims, but the tire remains deflated.

Figure 5:
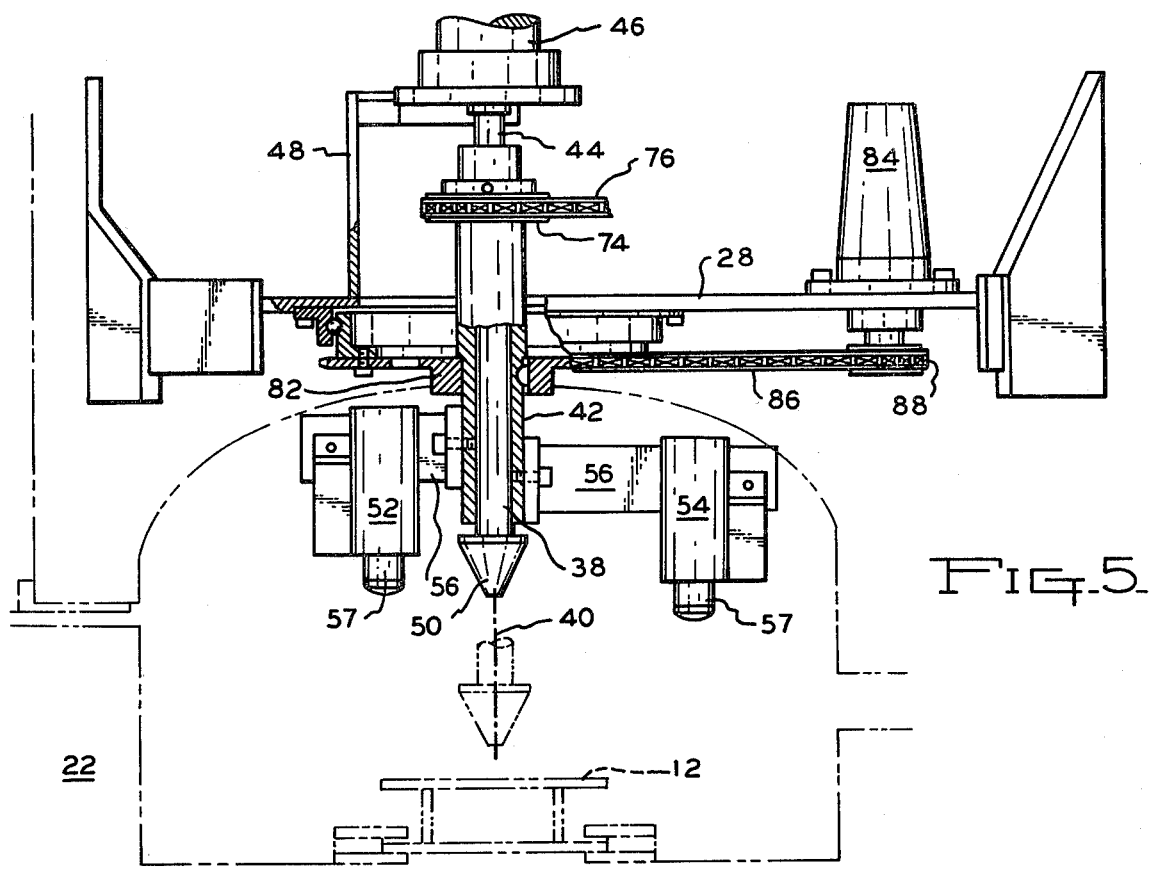
FIG. 5 is an elevational, detail, front view of the indicia sensing apparatus, the wheel positioning cone being shown in a lowered dotted line position.
Figure 6:
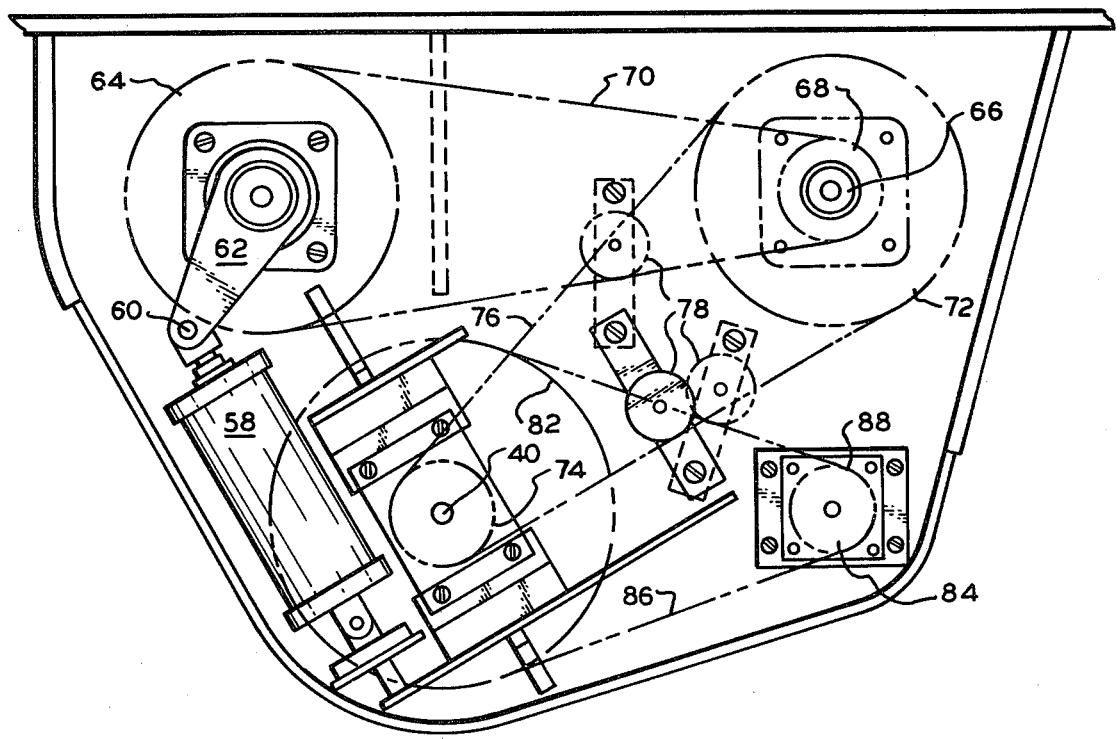
FIG. 6 is a top plan view of the indicia sensing apparatus as taken from the top of FIG. 5 with the wheel orientating motor removed.

The assembled tire and wheel are located upon a pallet 12, and are indexed by the conveyor to substantially orient the vertical wheel axis with a sensing axis 40 defined by the wheel orienting ram 38, FIG. 5.

The wheel orienting ram 38 comprises a vertically disposed shaft axially slidably mounted within sleeve 42, and the ram 38 is an extension of the piston 44 of an air motor 46 vertically supported upon the upper surface of the plate 28 by support bracket 48. The lower end of the ram includes a cone 50 adapted to enter the central hole in the wheel 32 whereby the wheel will be accurately coaxially aligned with the sensing axis 40.

The indicia sensing apparatus is supported upon the sleeve 42 and includes a pair of ultraviolet light sensing heads 52 and 54 affixed to the sleeve by brackets 56. The sensing heads each include an optical system generally indicated at 57, and electronic sensing means which are activated by the entrance of ultraviolet light entering the associated optical means as reflected from the wheel or tire indicia. Sensing head 52 is located relatively close to the axis 40 for sensing the location of the wheel indicia 36, while sensing head 54 is located at a greater radial distance for overlying the tire sidewall and sensing the tire indicia 34.

The sleeve 42, and sensing heads 52 and 54 are rotated about the sensing axis by an air operated expandable motor 58 mounted upon the upper side of the plate 28. The motor 58 is pivotally connected at 60 to the lever arm 62 of a chain sprocket 64 rotatably mounted in suitable bearings upon plate 28. An intermediate jack shaft 66 is also rotatably mounted upon plate 28 and includes a small diameter chain sprocket 68 connected to sprocket 64 by chain 70. The jack shaft 66 also includes a larger diameter chain sprocket 72 which is connected to the chain sprocket 74 coaxially affixed upon the sleeve 42 through chain 76. Thus, upon complete extension of the piston of motor 58 a rotation of the sleeve 42 occurs of slightly greater than 360° producing a complete rotation of the sensing heads above the wheel and tire. Chain tightening and slack preventing idlers, such as shown at 78, may be mounted upon the plate 28 for maintaining the chains 70, 76 and 86 taut.

The sensing heads 52 and 54 produce electronic signals upon the wheel and tire indicia being sensed thereby, and these electronic signals are fed into a computer generally indicated at 80. In that the computer must be advised of the relative rotational position of the sensing heads 52 and 54 at the time that the electronic indicia signals are supplied to it the relative rotational position of the sensing heads and sleeve 42 is sensed by the computer through a chain sprocket 82 mounted upon the sleeve 42 which drives a rotational transducer 84 mounted upon plate 28 through chain 86 and sprocket 88. Thus, the computer 80 will always be advised of the relative rotational position of the sensing heads 52 and 54 and such information will be utilized in producing the operating signal for later rotating the wheel and tire relative to each other.

The computer 80 is of a commercial form and includes a pulse generator and electronic signal storage means. The computer used in practice is a Unico System V Microprocessor as manufactured by Unico Incorporated of Franksville, Wisconsin.

Figure 4:
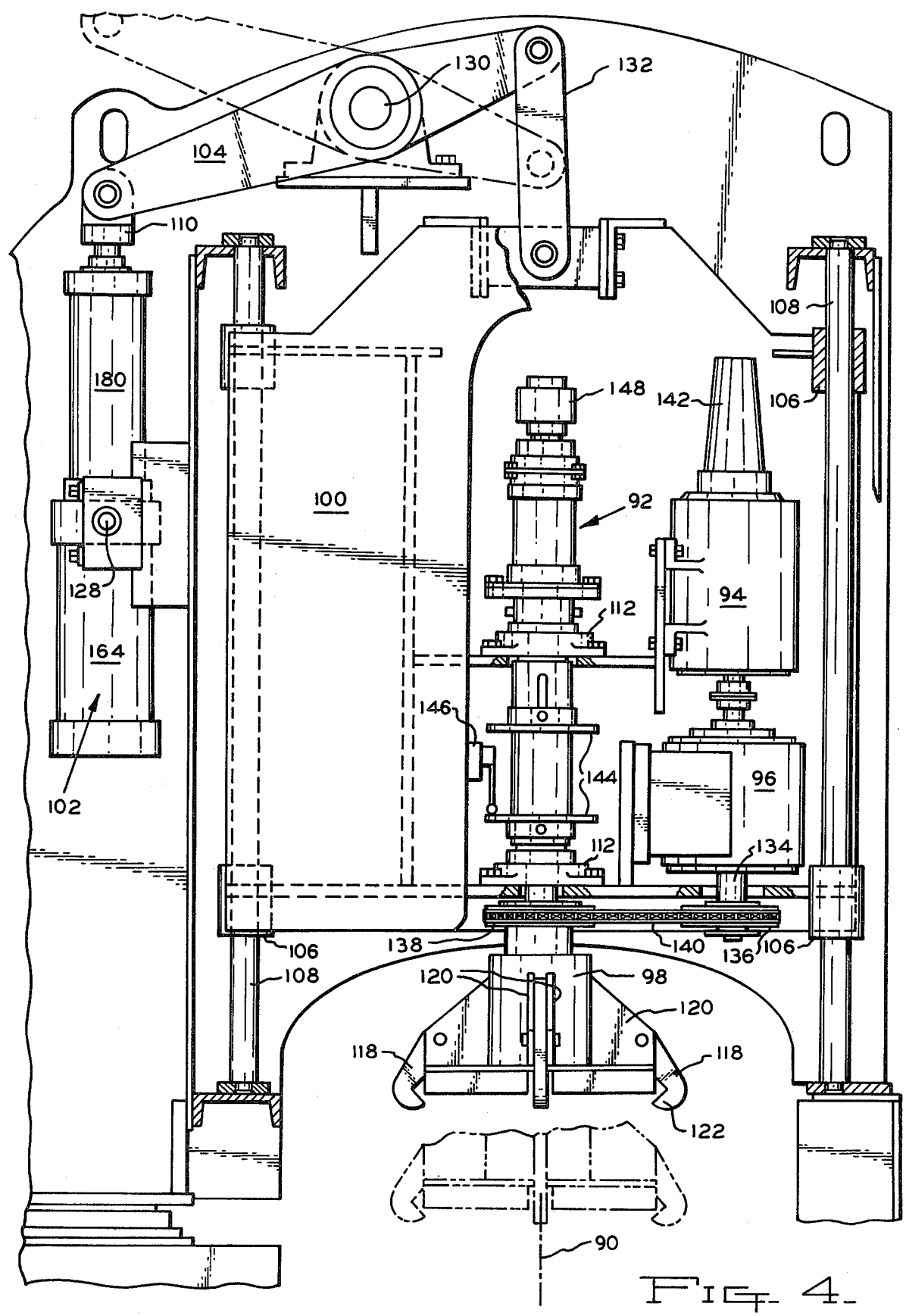
FIG. 4 is an enlarged, detail, elevational and partially sectioned view of the apparatus associated with the orientation axis for rotating the wheel relative to the tire.

The apparatus for producing relative rotation between the wheel and tire is housed between the front and rear plates 24 and 26, respectively, and this apparatus is best illustrated in FIG. 4. In the apparatus of FIG. 4 an orientation axis 90 is defined by shaft structure generally indicated at 92 which is vertically disposed centrally above the center line of the conveyor and supports the wheel clamp and associated structure.

As will be appreciated from FIG. 4, the shaft structure 92, DC motor 94, speed reducer 96 and wheel clamp 98 are all mounted upon carriage 100 which is raised and lowered under the influence of the air motor 102 and lever 104. The carriage 100 includes bearings 106 which slide upon vertically disposed guide rods 108 mounted within frame 20 and when the motor piston 110 is extended, the carriage 100 will lower the apparatus associated therewith, including wheel clamp 98 to the dotted position of FIG. 4. Retraction of the piston 110 raises the wheel carriage and associated structure to the inactive position.

The orientation shaft structure 92 includes bearing 112, and internally includes an axially extending tube 114, FIG. 7, upon which cone 116 is mounted as located within the wheel clamp 98. The wheel clamp 98 includes four pivotally supported fingers 118 each pivotal between a pair of support plates 120 and having an inner end adapted to be engaged by the operating cone 116. The lower outer ends of the fingers are provided with hook surfaces 122 adapted to engage the underside of the wheel rim, as will be noted from FIG. 7.

The wheel clamp 98 also includes a sensing bar 124, FIG. 7, connected to the shaft 126 and this sensing bar senses the engagement of the clamp with the upper rim of the wheel 32.

The vertical position of the wheel clamp 98 is determined by the large expansible air motor 102 pivotally connected to the frame 20 at 128 whose piston 110 is pivotally connected to the lever 104. Lever 104 is pivoted to frame 20 at 130 and the inner end of the lever 104 pivotally connects to link 132 which is pivotally connected to carriage 100 whereby extension of the motor piston 110 will lower the wheel clamp 98 to the dotted line position shown in FIG. 4.

Rotation of the wheel clamp 98 is accomplished through the DC electric motor 94 having an output shaft driving the speed reducer 96, which in turn includes an output shaft 134 driving chain sprocket 136 which is drivingly connected to the wheel clamp shaft structure by sprocket 138, and chain 140. The DC motor 94 is a Unico L186 ATC model having a 1750 rpm rate of rotation, and includes a flange mounted pulse generator no. GP-58 at 142, and the speed reducer 96 has a 230 rpm output.

The sensing bar 124 is connected to the microswitch operating collar 144 reciprocally mounted upon the shaft structure 92, FIG. 4. Thus, as the sensing bar 124 raises the switch collar 144 with respect to the microswitch 146 an electric signal will be generated which indicates that the wheel has been fully engaged and the cone 116 is to be operated to grip and raise the wheel prior to rotation thereof.

The cone tube 114 is reciprocated by an air motor 148 mounted at the upper end of the shaft structure 92 and pressurizing of the air motor 148 will raise the cone 116 relative to the fingers 118, as later described.

In operation, the conveyor 10 is indexed to bring the approaching wheel 32 and tire 30 into a position such that the wheel axis substantially aligns with the sensing axis 40. The presence of the wheel and tire at this location is sensed by photoelectric cells 154, FIG. 1, and the centering cone 50 is lowered by an extension of the piston 44 of cylinder 46. Upon the centering cone 50 engaging the central wheel opening to align the wheel axis with the sensing axis 40, a signal is given to the computer 80, and upon receiving this signal the scanning operation will begin by starting the extension of the piston of motor 58. As the motor 58 extends the sleeve 42 and sensing heads 52 and 54 rotate about the sensing axis, and the rotational position of the sensing heads will be recorded by the transducer 84. The sensing head 52 scans the wheel 32 for the wheel indicia 36, while the sensing head 54 scans for the tire indicia 34, and when either indicia is found the computer measures the distance by means of a pulse generator constituting a portion of the computer 80, and upon both indicia having been sensed and recorded by the computer a completion signal is given which permits the motor 58 to retract and activates the raising of the cone 50 by motor 46.

The conveyor 10 is then indexed forward so that the wheel axis will coincide with the orientation axis 90. When the conveyor has located the wheel 32 at the proper location a photoelectric cell, not shown, is blocked, the conveyor stops, and the motor 102 is energized to lower the carriage 100 and the wheel clamp 98. At this time the tire lift cylinders 150 are energized to permit the piston pads 152 thereof to engage the underside of the tire sidewall and raise the tire slightly. The wheel clamp 98 will lower until the sensing bar 124 contacts the upper rim of the wheel 32, and the air motor 102 will then stop downward travel of the carriage and wheel clamp by action of switch 146, and a valve will close hydraulically locking the wheel clamp 98 in place, as later described. At this time the expansible motor 148 will retract raising the clamp cone 116, FIG. 7, causing the fingers 118 to pivot to move the hook surfaces 122 under the wheel rim causing the fingers to lift the wheel 32 approximately ¼" above the pallet structure.

When the wheel 32 is so clamped, an electrical signal similar to switch 146 is given to the computer 80, and the computer will produce an output signal energizing the DC motor 94. The computer has previously sensed the relative rotational positions of the tire and wheel indicia 34 and 36 relative to the axis of the wheel, and the computer determines the direction that the wheel should rotate relative to the tire to most quickly align the wheel and tire indicia, and the DC motor 94 is energized in that direction which rotates the wheel clamp to minimize the wheel rotation necessary to achieve indicia orientation. As the DC motor 94 rotates the wheel clamp 98 and clamped wheel 32 it also drives the pulse generator 142 which feeds a signal back to the computer 80. Feedback pulses are compared to the pulse count stored during the tire and wheel indicia sensing operation and the DC motor drive rotation is stopped at the position the pulse count "zeros" indicating the desired orientation of the wheel and tire. With the orientation complete, the clamp motor 148 extends unclamping the wheel 32 by lowering the cone 116, and the wheel clamp motor 102 retracts causing the wheel clamp and carriage 100 to rise. The tire clamp lift cylinders 150 lower, and the apparatus is now ready for its next cycle. The conveyor 10 is indexed, and the wheel and tire leaving the orientation axis have been oriented relative to each other as their indicia has been aligned and the tire is now ready for inflation.

The control circuit for the various expansible motors is shown in FIG. 8, and as identical components are used in the circuitry of these motors similar components are identified by identical reference numerals.

The wheel centering motor 46 is operated by the solenoid control valve 156, and the circuit to the motor includes flow control valves 158 and a pressure switch 160. The motor 58 which rotates the sensing heads 52 and 54 is controlled by solenoid operated valve 162 and includes flow control valves on both sides of the motor piston.

Positioning of the wheel clamp 98, as described above, is under control of the expansible motor 102 which is a combined pneumatic and hydraulic unit. The pneumatic motor portion 164 is controlled by valve 166, and valve solenoid 168 functioning to extend the motor piston 110 to lower the wheel clamp, while solenoid 170 is employed to shift the valve 166 to the position which retracts the piston to raise the wheel clamp. Regulator 172 is employed in the circuit to the valve 166, and the compressed air supply for the entire system is introduced at valve 174 through filter 176 and lubricator 178. Locking of the motor 102 at a given location is achieved by coaxial cylinder portion 180 having its own piston 182, and cylinder portion 180 is filled with a hydraulic fluid whereby bypassing the piston 182 is under control of the solenoid operated valve 184 and flow control 186 and air release valve 188. Thus, shifting of the valve 184 by its solenoid can open the flow through the valve 184 to permit the motor 102 to expand and retract under air pressure. Closing of the valve 184 will lock the piston 110 in the desired location, as determined by engagement of the wheel clamp head sensing bar 124 with the wheel during lowering of the wheel clamp.

The operation of the wheel clamp fingers 118 is by expansible motor 148, which is controlled by solenoid operated valve 190, and as described above, retraction of the piston of motor 148 causes the clamp fingers to grip the wheel and raise the wheel slightly with respect to the tire.

A pair of tire lift cylinders 150 are employed to raise the tire from the pallet prior to relative wheel and tire rotation, in order to reduce the frictional engagement between the tire and wheel, and also, frictionally restrain the tire, and the control of the tire lift cylinders is by solenoid operated valve 192. Flow control devices 158 are also utilized in the circuit of the tire lift cylinders to regulate the rate of piston movement.

To reduce the noise level of the pneumatic circuit operation mufflers 194 are used at those locations wherein air is exhausted to atmosphere.

From the above description it will be appreciated that the apparatus of the invention automatically permits a wheel and tire to be angularly related to each other in a predetermined manner relative to the axis of the wheel prior to tire inflation, and such wheel and tire orientation is quickly and automatically achieved without human supervision.

It is appreciated that various modifications to the inventive concepts may be apparent to those skilled in the art without departing from the spirit and scope of the invention.

We claim:

1. The method of orienting a tire and its wheel to each other about a common axis wherein a wheel is located within a deflated tire and the tire and wheel each have reference indicia defined thereon, the wheel and tire indicia initially being randomly angularly related to each other about said axis, comprising the steps of sensing the angular relationship of the wheel and tire indicia to each other about the wheel and tire axis, recording and comparing said angular relationship of said wheel and tire indicia, and rotating said wheel and tire relative to each other about said axis as determined by said recording and comparing to orient said wheel and tire indicia to each about said wheel and tire axis in a predetermined relationship.

2. The method of orienting a tire and its wheel to each other as in claim 1 including the step of analyzing the recording and comparison of the angular relationship of said wheel and tire indicia to determine the direction of relative rotation of the wheel and tire which minimizes the relative rotation necessary to achieve said predetermined relationship between the indicia of the wheel and tire, said wheel and tire being rotated relative to each other about said axis in said direction which minimizes relative rotation to orient said wheel and tire indicia in said predetermined relationship.

3. The method of orienting a tire and its wheel to each other about a common axis wherein a wheel is located within a deflated tire and the tire and wheel each have reference indicia defined thereon, the wheel and tire indicia initially being randomly angularly related to each other about said axis, comprising the steps of aligning the wheel axis with a sensing axis, rotating indicia sensing means about said sensing axis to sense the angular relationship of the wheel and tire indicia to each other about said sensing axis, recording and comparing said angular relationship of said wheel and tire indicia about said sensing axis, aligning the wheel axis with an orientation axis without changing the angular relationship of the wheel and tire about the wheel axis, and rotating said wheel and tire relative to each other about said orientation axis as determined by said recording and comparing to orient said wheel and tire indicia to each other about said wheel and orientation axis in a predetermined relationship.

4. The method of orienting a tire and its wheel to each other as in claim 3 including the step of analyzing the recording and comparison of the angular relationship between the wheel and tire indicia about said sensing axis to determine the direction of relative rotation of the wheel and tire which minimizes the relative rotation necessary to achieve said predetermined relationship between the wheel and tire, said wheel and tire being rotated relative to each other about said orientation axis in the direction which minimizes relative rotation to orient said wheel and tire indicia in said predetermined relationship.

5. The method of orienting a tire and its wheel to each other as in claim 3, wherein the step of rotating said wheel and tire relative to each other about said orientation axis comprises raising the wheel relative to said tire to minimize frictional engagement between said tire and wheel during relative rotation.

6. Tire orientation apparatus for rotatably orienting a deflated tire relative to its wheel about the wheel axis wherein the tire and wheel each include character indicating indicia, comprising, in combination, first means for positioning a wheel having an axis and having a deflated tire thereon relative to an indicia sensing station, second means defined at said indicia sensing station sensing the angular location of the tire and wheel indicia relative to each other about said wheel axis and producing an output signal indicative of the relative relationship of said tire and wheel indicia, and third means controlled by said output signal rotating the wheel and tire relative to each other about the wheel axis to angularly position the wheel and tire indicia relative to each other in a predetermined relationship relative to the wheel axis.

7. In tire orientation apparatus as in claim 6 wherein said first means positions said wheel axis coincident to a sensing axis at said sensing station and said second means comprises indicia sensing means rotatable about said sensing axis.

8. In tire orientation apparatus as in claim 7 wherein said third means includes clamp means rotatable about an orientation axis coincident with said wheel axis.

9. In tire orientation apparatus as in claim 7, said indicia sensing means comprising a light responsive receiver producing an electrical signal upon sensing the presence of said wheel and tire indicia.

10. In tire orientation apparatus as in claim 9 wherein said indicia sensing means comprises first and second light responsive receivers, said first receiver producing a first electrical signal upon sensing the presence of the wheel indicia, said second receiver producing a second electrical signal upon sensing the presence of the tire indicia, and signal receiving and storing means receiving said first and second signals analyzing the duration between said signals to produce said output signal.

11. In tire orientation apparatus as in claim 8, said clamp means comprising a wheel clamp rotatable about said orientation axis adapted to selectively clamp said wheel upon said wheel axis being coincident with said orientation axis, and motor means connected to said wheel clamp selectively operating said clamp between clamped and unclamped conditions.

12. Tire orientation apparatus for rotatably orientating a deflated tire relative to its wheel about the wheel axis wherein the tire and wheel each include character indicating indicia, and the indicia are to be related in a predetermined manner about the wheel axis comprising, in combination, wheel positioning means defining an indicia sensing axis, wheel engaging means defined upon said wheel positioning means coaxially aligning the wheel with said sensing axis, first motor means selectively positioning said wheel positioning means between wheel engagement and disengagement conditions, first and second light responsive receivers mounted for rotation about said sensing axis, said first receiver producing a first electrical signal upon sensing the presence of the wheel indicia, said second receiver producing a second electrical signal upon sensing the presence of the tire indicia, second motor means rotating said receivers about said sensing axis, signal receiving and storing means receiving said first and second signals analyzing the duration between said signals to produce an output signal, wheel clamping means, wheel clamping support means defining an orientation axis and supporting said wheel clamping means, third motor means selectively translating said wheel clamping means between wheel clamping and wheel release positions, wheel rotating means operatively connected to said wheel clamping means for rotating said wheel clamping means about said orientation axis while in a wheel clamping position, first control means controlling and operating said wheel rotating means in accord with said output signal to relate said wheel and tire indicia to each other about said wheel axis in a predetermined manner, transfer means transferring the wheel and tire from alignment with said sensing axis to alignment with said orientation axis, second control means operating said motor means, and third control means selectively operating said transfer means.

13. Tire orientation apparatus as in claim 12 wherein said first and second light responsive receivers comprises ultraviolet light receivers.

14. Tire orientation apparatus as in claim 12 wherein said signal receiving and storing means includes pulse storing means and said wheel rotating means includes a direct current drive motor and a pulse generator.

15. Tire orientation apparatus as in claim 12 wherein said signal receiving and storing means includes means analyzing the relative angular positions of the tire and wheel indicia with respect to said sensing axis whereby said output signal rotates said wheel rotating means in the direction requiring the least relative rotation between the wheel and tire to align said indicia in the desired relationship.

* * * * *